United States Patent
Koteich (10) Patent No.: US 12,206,345 B2
(45) Date of Patent: Jan. 21, 2025

(54) COMPARISON OF ROTOR FLUX PARAMETERS

(71) Applicant: Schneider Toshiba Inverter Europe SAS, Pacy sur Eure (FR)

(72) Inventor: Mohamad Koteich, Vernon (FR)

(73) Assignee: Schneider Toshiba Inverter Europe SAS, Pacy sur Eure (FR)

( * ) Notice: Subject to any disclaimer, the term of this patent is extended or adjusted under 35 U.S.C. 154(b) by 145 days.

(21) Appl. No.: 18/118,768

(22) Filed: Mar. 8, 2023

(65) Prior Publication Data

US 2023/0299699 A1  Sep. 21, 2023

(30) Foreign Application Priority Data

Mar. 15, 2022 (EP) .................... 22305296

(51) Int. Cl.
*H02P 21/14* (2016.01)
*H02P 21/00* (2016.01)
*H02P 21/22* (2016.01)

(52) U.S. Cl.
CPC ........ *H02P 21/141* (2013.01); *H02P 21/0025* (2013.01); *H02P 21/22* (2016.02); *H02P 2207/05* (2013.01)

(58) Field of Classification Search
CPC .... H02P 21/141; H02P 21/0025; H02P 21/22; H02P 2207/05; H02P 29/662; H02P 23/14; H02P 6/28; H02P 2205/01
USPC ............... 318/400.02, 400.01, 700
See application file for complete search history.

(56) References Cited

U.S. PATENT DOCUMENTS 6,683,428 B2 * 1/2004 Pavlov ............... H02P 21/13
318/432

FOREIGN PATENT DOCUMENTS

| EP | 3125418 A1 | 2/2017 |
| EP | 3876419 A1 | 9/2021 |
| KR | 20190142630 A | 12/2019 |
| TW | I753767 B | 1/2022 |

OTHER PUBLICATIONS

European Search Report and Search Opinion dated Sep. 29, 2022 for corresponding European Patent Application No. EP22305296.0, 29 pages.

* cited by examiner

*Primary Examiner* — David Luo
(74) *Attorney, Agent, or Firm* — Locke Lord LLP

(57) ABSTRACT

Examples include a method for detecting the evolution of the magnetic state of a permanent magnet rotor. The method includes, during a first and a second time interval, applying a respective direct current command signal to the motor to estimate a respective stator resistance value, and applying a respective alternative voltage command signal corresponding to a specific direct axis stator current value to the motor while measuring respective stator phase current values. The method also includes determining respective rotor flux parameters as a function of the measured respective stator phase current values and of the estimated respective stator resistance values. The method further includes comparing the respective rotor flux parameters. The first and second time intervals are separated by a time period which exceeds at least 100 times any one of a first or second interval length.

15 Claims, 6 Drawing Sheets

COMPARISON OF ROTOR FLUX PARAMETERS

FIELD OF THE INVENTION

This invention relates to a method for monitoring the evolution of the magnetic state of a permanent magnet rotor in a three phases synchronous motor using a variable speed drive, and to a computer-readable storage medium, variable speed drive and server implementing said method.

BACKGROUND

In a conventional variable speed drive of a synchronous electrical motor comprising a permanent magnet, in particular a permanent magnet comprised in a rotor of the synchronous motor to produce a magnetic flux, a control law is executed by a processing unit and receives an input reference. As a function of such input reference and of measurements of values on the motor, the processing unit determines a voltage reference to be applied to the electrical motor. From this voltage reference, the processing unit determines the control voltages to be applied to each output phase connected to the motor. These voltages are applied to the motor using an electronic power architecture.

As a general rule, the control law takes the magnetic flux of the permanent magnet into account. Such magnetic flux may evolve over time, for a variety of reasons, for example due an exposure of rotor permanent magnets to demagnetizing field, to temperature, or to the motor driving an excessive load. This evolution may in some cases be irreversible, and may impact motor performance, motor health or motor lifetime.

The aim of the invention is therefore to propose a method for detecting the evolution of the magnetic state of a permanent magnet rotor in a three phases synchronous motor using a variable speed drive, the method permitting avoiding or mitigating issues introduced by an evolution of the magnetic flux over time.

SUMMARY

The invention is defined by the appended independent claims. Additional features and advantages of the concepts herein disclosed are set forth in the description which follows.

The present disclosure describes a method for detecting an evolution of a magnetic state of a permanent magnet rotor in a three phases synchronous motor using a variable speed drive, the method comprising:
  during a first time interval:
    applying, using the variable speed drive, a first direct current command signal to the motor;
    in response to the applying the first direct current command signal to the motor, estimating a first stator resistance value;
    applying, using the variable speed drive, a first alternative voltage command signal to the motor, the first alternative voltage command signal corresponding to a specific direct axis stator current value;
    measuring, during the applying of the first alternative voltage command signal to the motor, first stator phase current values;
  determining, in function of the measured first stator phase current values and of the estimated first stator resistance value, a first rotor flux parameter;
  during a second time interval:
    applying, using the variable speed drive, a second direct current command signal to the motor;
    in response to the applying the second direct current command signal to the motor, estimating a second stator resistance value;
    applying, using the variable speed drive, a second alternative voltage command signal to the motor, the second alternative voltage command signal corresponding to the specific direct axis stator current value;
    measuring, during the applying of the second alternative voltage command signal to the motor, second stator phase current values;
  determining, in function of the measured second stator phase current values and of the estimated second stator resistance value, a second rotor flux parameter; and
  comparing the first and the second rotor flux parameters, whereby:
    the first time interval has a first interval length;
    the second time interval has a second interval length; and
    the first and second time intervals are separated by a time period which exceeds at least 100 times any one of the first or second interval length.

Such a method permits detecting the evolution of the magnetic state of a permanent magnet rotor over the time period in a manner which reduces an uncertainty which could otherwise be introduced by a variation in stator resistance and by an uncertainty as to values of stator-phase inductance.

Optionally, the method comprises:
  detecting a difference between the first and the second rotor flux parameter consistent with a rotor flux reduction exceeding a predetermined drift threshold; and
  in response to the detecting, limiting one or more of a motor speed or motor load in order to reduce an operating temperature.

Determining a drift in rotor flux could indeed permit limiting further flux degradation due to excessive operating temperatures.

Optionally, the method comprises:
  detecting a difference between the first and the second rotor flux parameter consistent with a rotor flux reduction exceeding a predetermined demagnetization threshold; and
  in response to the detecting, providing a demagnetization alert.

Detecting demagnetization could indeed permit accelerating the replacement of a motor or motor component and limit operational downtime.

Optionally, the motor is assigned a repetitive mission profile, whereby the specific direct axis stator current value is determined consistently with the repetitive mission profile. This permits integrating at least part of the methods according to this disclosure in such repetitive mission profile, thereby reducing an impact on motor operating productivity.

Optionally, the specific direct axis stator current value is substantially zero. Proceeding in this manner suppresses any impact of direct axis stator-phase inductance value on the rotor flux parameter determinations.

Optionally, the method comprises iterations during one or more additional intervals. Proceeding by iteration permits extending flux monitoring beyond the time period, and obtaining trend data over time.

Optionally, the time period comprises a motor stressful operation event. The magnetic state is indeed more likely to be impacted by such events.

Optionally, the method comprises displaying a measure of the comparison between the first and the second rotor flux parameters. Such display permits maintaining a user or operator informed of the magnetic state evolution over time.

Optionally, the method comprises modifying a maintenance plan in function of the comparison between the first and the second rotor flux parameters and of a length of the time period. A maintenance plan may for example be accelerated in case of magnetic state degradation, thereby reducing an impact on productivity, or extending motor lifetime.

Optionally, the method comprises sending a measure of the comparison between the first and the second rotor flux parameters over a network. Such sending permits transmitting the measures to a remote location.

The present disclosure also describes a server comprising a processor, a networking module and a memory, whereby the server is connected via a network to a plurality of variable speed drives configured to send the respective measure of the comparison between the respective first and second rotor flux parameters over the network, whereby the processor of the server is to compile the received measures of comparison between the respective first and second rotor flux parameters. Such centralized collection of information permits running a statistical analysis and detecting potential issues affecting one or more types of motors.

Optionally, the server is to further receive, via the networking module, time period data from the plurality of variable speed drives. Such additional information enriches the data collected and increases the value of a related statistical analysis.

Optionally, the processor of the server is to modify a maintenance plan in function of the received measures of comparison. Such modifications may extend motor life span.

The present disclosure also describes a computer-readable storage medium comprising instructions which, when executed by a processor, cause the processor to carry out any of the methods hereby described. Such processor may for example be a processor of a variable speed drive of the synchronous motor comprising the permanent magnet rotor.

The present disclosure also describes a variable speed drive of a synchronous motor comprising a permanent magnet rotor, the variable speed drive comprising a processor and a memory, the processor being configured to operate according to any of the methods hereby described. Such variable speed drive may thereby operate or control the motor with increased reliability.

DETAILED DESCRIPTION

This disclosure applies to a synchronous motor using a variable speed drive. A variable speed drive should be understood in this disclosure as an electronic, virtual or software implemented control unit for an electric motor. In some examples, a variable speed drive comprises a processing and control unit intended to implement a control law by taking into account, for example, an input speed set point, voltages to be applied to the electric motor during normal operation of the motor and control instructions to be applied to an inverter stage in order to obtain these output voltages. The control law may be of a vector or a scalar type. The variable speed drive may comprise a rectifier stage at an input, such rectifier stage being intended to convert an alternating voltage supplied by an electric network into a direct voltage. The variable speed drive may also comprise a direct power bus connected, on the one hand, to the rectifier stage and, on the other hand, to an inverter stage. The direct power bus can comprise two power lines connected together by at least one bus capacitor configured to stabilize the voltage of the bus. The rectifier may be of a passive type such as a diode bridge or an active type based on controlled transistors. The inverter stage may be connected at the output of the direct power bus and intended to cut off the voltage supplied by the bus at a variable voltage to the electric motor; the inverter stage comprising for example multiple switching arms each comprising controlled power transistors, for example of the IGBT (Insulated Gate Bipolar Transistor) type, for applying the variable voltage to the electric motor. The inverter may be controlled by, for example, a conventional technique using a PWM (Pulse Width Modulation) or Vector Control type. The control law performed by the processing unit UC makes it possible to determine the voltage to be applied to the output phases intended to be connected to the motor to be controlled.

According to this disclosure, a synchronous motor is controlled by, or using, the variable speed drive. A synchronous motor should be understood as an alternating-current (AC) electric motor designed to run at a speed which varies with the frequency of a power source applied to a stator of the motor. Starting a synchronous motor may be challenging and a synchronous motor starting procedure may be implemented in a control law applied by the variable speed drive of the synchronous motor to start. In the synchronous motors according to this disclosure, the motor speed is maintained or obtained by a permanent magnet rotor of the motor which will tend to revolve at the same speed as a magnetic field generated by the power source applied to stator windings. In other words, in a stable state of operation, the rotor rotates at the same speed as a revolving field generated by the stator. In some examples, the stator comprises a cylindrical frame with windings, such as three phase windings, located in slots of the stator. During stable operation, as a mechanical load is applied, the rotor slips back a number of degrees with respect to a rotating field of the stator, developing torque and continuing to be drawn around by this rotating field. The angle between a magnetic field of the rotor and a magnetic field of the stator normally increases as load increases.

According to this disclosure, the magnetic field for the rotor of the synchronous motor is provided by using one or more permanent magnets, whereby the motor comprises a permanent magnet rotor generating a magnetic flux. The rotor may also comprise one or more windings in addition to the one or more permanent magnets, such as a damper winding for example. The use of permanent magnets may eliminate or reduce the use of slip rings and of an external power source dedicated to generating a rotor magnetic field. While a magnetic flux value generated by windings may be evaluated as a function of the power applied to the windings, the magnetic flux value produced by one or more permanent magnets is a function of each permanent magnet, and may in principle not be evaluated in a simple manner. Such magnetic flux value should however be taken into account as a factor in a control law aimed at driving the motor. In some cases, such magnetic flux value is provided by a manufacturer of the motor, for example on a visible plaque displaying motor characteristics or on a motor data sheet. A user of the motor may then use such manufacturer provided magnetic flux value as a factor of the control law used to operate the motor. The magnetic flux value may also evolve over time, the material of the permanent magnet being submitted to external influences such as temperature and external magnetic field which may impact an original magnetic flux value and modify it. Such inaccuracies have a negative impact on controlling the motor. The methods hereby described reduce or prevent such negative impact.

As will be explained below, the method relies on comparing a first and the second rotor flux parameters at different points in time, and to do so in conditions which reduce or suppress uncertainty due to other factors (stator resistance variation and stator phase inductance values) and permit a sensorless determination (sensorless in the sense that the methods according to this disclosure may operate without mechanical sensors and without magnetic flux sensor, in particular in absence of a speed sensor and of a magnetic flux sensor). The method relies on fundamentals of motor control theory, such theory describing relationships, at any point in time, between stator currents, stator resistance, stator phase inductance and rotor magnetic flux. The method permits, at a certain point in time, ascertaining stator resistance and operating, in a reproduceable manner, the motor at a point minimizing the impact of stator phase inductances, thereby permitting determining a rotor flux parameter in function of measured stator phase current values.

Figure 1:
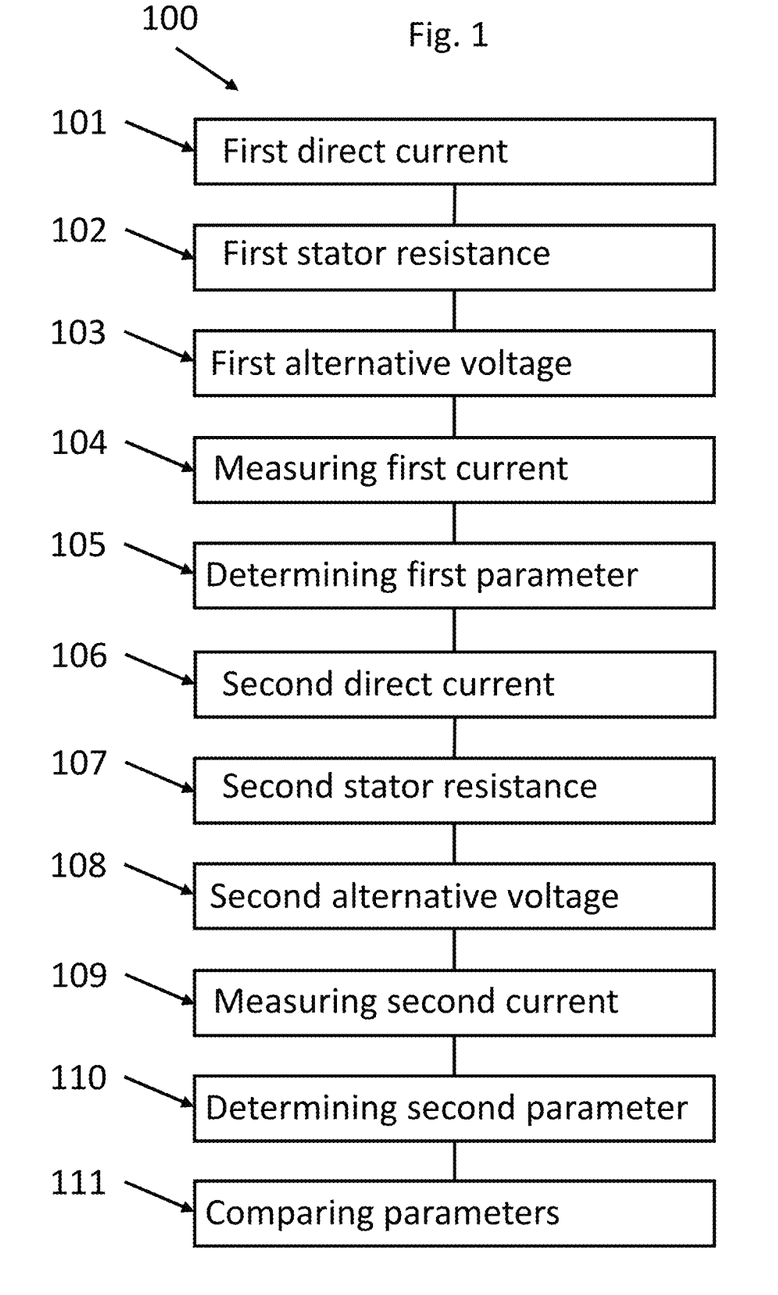
FIG. 1 illustrates an example method.

FIG. 1 illustrates an example method 100 according to this disclosure. As will be explained in more details below, some blocks of method 100 take place during a specific time interval. Each time interval should be understood as a time interval during which operational characteristics of the motor concerned are relatively stable. Such stability of operational characteristics may vary greatly from motor to motor and depend on numerous factors such as ambient conditions or motor sizes. In some examples, a time interval is of less than 1 h, less than 30 min, less than 10 min, less than 1 min, less than 20 s, less than 5 s or less than 1 s.

As illustrated in bloc 101, method 100 comprises applying, during a first time interval, and using the variable speed drive, a first direct current command signal to the motor. Such direct current should be understood as a direct current injection in stator windings of the motor.

As illustrated in block 102, method 100 comprises, during the same first time interval, and in response to the applying the first direct current command signal to the motor, estimating a first stator resistance value. It should be understood that this estimation may be based on Ohm's law, the variable speed drive applying a given direct voltage and measuring a given direct current to the stator windings, directly leading to determining the first stator resistance value ("first" being used as a label for values relating to the first time interval). This part of the method leads to removing uncertainty as to stator resistance value, which may vary for example in function of operating or ambient temperature.

As illustrated in block 103, method 100 comprises applying, during the same first time interval, and using the variable speed drive, a first alternative voltage command signal to the motor, the first alternative voltage command signal corresponding to a specific direct axis stator current value. The specific direct axis stator current value should be understood as the current value along the direct axis in a direct axis/quadrature axis of the stator of the motor. In this representation, the direct axis current is used to control the rotor magnetizing flux, while a corresponding quadrature axis current corresponds to the motor torque. Real currents may be applied to the stator windings to reach a desired specific direct axis stator current value.

As illustrated in block 104, method 100 comprises measuring, during the same first time interval, and during the applying of the first alternative voltage command signal to the motor, first stator phase current values. Such values are thereby a result of the motor operating at operating point of the motor corresponding to the specific direct axis stator current value during the first time interval.

As illustrated in block 105, method 100 comprises determining, in function of the measured first stator phase current values and of the estimated first stator resistance value, a first rotor flux parameter. While such determination takes into account values corresponding to the first time interval, such determination may take place at a different time. The determination is the determination of a rotor flux parameter which, while it may correspond to the rotor flux itself, may be representative of the rotor flux without being the rotor flux itself. The rotor flux parameter may for example be in Weber or may for example be unitless. One should note that in the determination, the stator resistance is a given, obtained through block 102. While stator inductance values may or may not be known, for example from a motor plate or using auto-tune identification algorithms, their actual values have no impact or a reduced impact on the reliability of the methods hereby described, as will be explained below.

As illustrated in bloc 106, method 100 comprises applying, during a second time interval, and using the variable speed drive, a second direct current command signal to the motor. Such direct current should be understood as a direct current injection in stator windings of the motor. The second direct current command signal may be the same as or may differ from the first direct current command signal. In some examples, the second direct current command signal is the same as the first direct current command signal.

As illustrated in block 107, method 100 comprises, during the same second time interval, and in response to the applying the second direct current command signal to the motor, estimating a second stator resistance value ("second" being used as a label for values relating to the second time interval). Due to the variability of stator resistance for example in function of operating or ambient temperature, it is possible that the second stator resistance be significantly different from the first stator resistance.

As illustrated in block 108, method 100 comprises applying, during the same second time interval, and using the variable speed drive, a second alternative voltage command signal to the motor, the second alternative voltage command signal corresponding to the same specific direct axis stator current value as used in block 103. It should be understood that while the specific direct axis stator current value is the same during block 103 and block 108, a minimal variation, for example of less than about 0.2% or of less than about 0.1%, may be acceptable and considered as a same value. Using such same value between blocks 103 and 108 leads to suppressing or minimizing an impact of a direct axis stator inductance value, thereby participating to the reliability of the methods hereby described. While such a direct axis stator inductance value may be unknown or unprecise, such value is relatively stable over time, unlike the stator resistance, and the use of a same specific direct axis stator current value in blocks 103 and 108 leads to a same impact on determining a first or a second rotor flux parameter. This may be explained by the following equation (keeping in mind that other equations may be used to represent relationships between such physical values, for example using other conventions or representations):

$$\phi_r = \frac{v_{sq} - R_s i_{sq}}{\omega_s} - L_d i_{sd}$$

whereby:

$\phi_r$ represents the rotor flux;

$v_{sq}$ represents the voltage applied to the stator windings in the rotor reference frame;

$R_s$ represents the stator resistance estimated in (respectively) block 102 or block 107;

$i_{sq}$ represents a quadrature axis stator current value (which may be determined, together with the corresponding direct axis stator current value, by measurement of stator phase current values and by estimating or measuring the rotor position);

$\omega_s$ represents a pre-defined electrical angular frequency synchronous with the motor speed (keeping in mind that the motor is a synchronous motor, such that this electrical angular frequency synchronous with the motor speed is known);

$L_d$ represents the direct axis stator inductance value; and $i_{sd}$ represents the same specific direct axis stator current value used in both blocks 103 and 108.

In some examples, the specific direct axis stator current value is substantially zero, thereby suppressing or minimizing any impact from the direct axis stator inductance value. Substantially zero should be understood for example as less than 0.1%, less than 0.05% or less than 0.01% of a nominal current value.

One may at this point clarify that the current and voltage values corresponding to the direct axis/quadrature axis of the stator of the motor are determined in function of a rotor position angle θ in a fictitious quadrature alpha, beta orthogonal coordinate system whereby the alpha axis is aligned with one of the phases of the stator current space. Such rotor position angle corresponding to a specific operating point of the motor may be determined in function of voltages, currents, stator resistance and quadrature axis stator inductance value. Voltages are known as they corresponds to the applied signal of blocs 103 or 108. Currents are measured in blocks 104 or 109. Stator resistance is estimated in blocks 102 or 107. This leaves the quadrature axis stator inductance value. It was however found that the impact of such quadrature axis stator inductance value was minimal due to its position both at the numerator and denominator of the following equation (again keeping in mind that other equations may be used to represent relationships between such physical values, for example using other conventions or representations):

$$\theta = a\tan\left(-\frac{v_{s\alpha} - R_s i_{s\alpha} + \omega_s L_q i_{s\beta}}{v_{s\beta} - R_s i_{s\beta} - \omega_s L_q i_{s\alpha}}\right)$$

whereby:

θ represents the rotor position angle in alpha, beta coordinate system;

$v_{s\alpha}$ represents the voltage applied to the stator windings in the stator alpha axis representation;

$v_{s\beta}$ represents the voltage applied to the stator windings in the stator beta axis representation;

$i_{s\alpha}$ represents the current applied to the stator windings in the stator alpha axis representation;

$i_{s\beta}$ represents the current applied to the stator windings in the stator beta axis representation; and $L_q$ represents the quadrature axis stator inductance value.

$R_s$ represents the stator resistance estimated in (respectively) block 102 or block 107;

$\omega_s$ represents a pre-defined electrical angular frequency synchronous with the motor speed (keeping in mind that the motor is a synchronous motor, such that this electrical angular frequency synchronous with the motor speed is known); and $L_d$ represents the direct axis stator inductance value.

As illustrated in block 109, method 100 comprises measuring, during the same second time interval, and during the applying of the second alternative voltage command signal to the motor, second stator phase current values. Such values are thereby a result of the motor operating at operating point of the motor corresponding to the specific same direct axis stator current value as in block 104, during the second time interval. One should note that the operating temperature, ambient temperature or load may be different between the first and the second intervals.

As illustrated in block 110, method 100 comprises determining, in function of the measured second stator phase current values and of the estimated second stator resistance value, a second rotor flux parameter. While such determination takes into account values corresponding to the second time interval, such determination may take place at a different time.

As illustrated in block 111, method 100 comprises comparing the first and the second rotor flux parameters, whereby the first time interval has a first interval length, the second time interval has a second interval length, and the first and second time intervals are separated by a time period which exceeds at least 100 times any one of the first or second interval length. Such comparison permits detecting an evolution of the rotor flux parameter (and in consequence of the rotor flux) between the first and the second time intervals. It is important to note that the interval lengths and the time period differ by at least two order of magnitudes. This reflects the fact that, on one hand, the intervals should be relatively short to ensure that the stator resistance value is reliably estimated during a respective interval, and, on the second hand, to detect flux variation over relatively longer periods of time, such flux variations being practically irreversible and taking place progressively over the life time of a given motor. In other words, whereas a time interval according to this disclosure is, relatively speaking, representing an instantaneous point of operation of a motor, a time period takes a scale consistent with a motor life time. A time period may for example last for more than a day, more than a week, more than a month or more than a year. A time period may for example correspond to more than 10 hours, more than 100 hours, more than 1000 hours, more than 10000 hours or more than 100000 hours of operation of a given motor. In some examples, the first and second time intervals are separated by a time period which exceeds at least 1000 times, 10000 times or 100000 times any one of the first or second interval length.

One should note that while examples hereby described rely on a first and second interval and on a single time period, any of the methods hereby described may comprise iterations during one or more additional intervals, such intervals being associated to corresponding time periods.

Such iterations may provide data over significant amounts of time, permitting for example the detecting of long term trends, or permitting corelating specific missions or mission types with flux deterioration In some examples, the time period comprises a motor stressful operation event. A stressful operation event may for example comprise one or more of the motor running at a speed exceeding a nominal speed, the motor running a load exceeding a nominal load value, and the motor running permanently for an amount of time exceeding a nominal amount. Operating in such stressful conditions may trigger blocks such as blocks 106 to 110, the second time interval following the stressful operation event, taking into account blocks 101 to 105 related to a first time interval preceding the stressful operation event.

Figure 2:
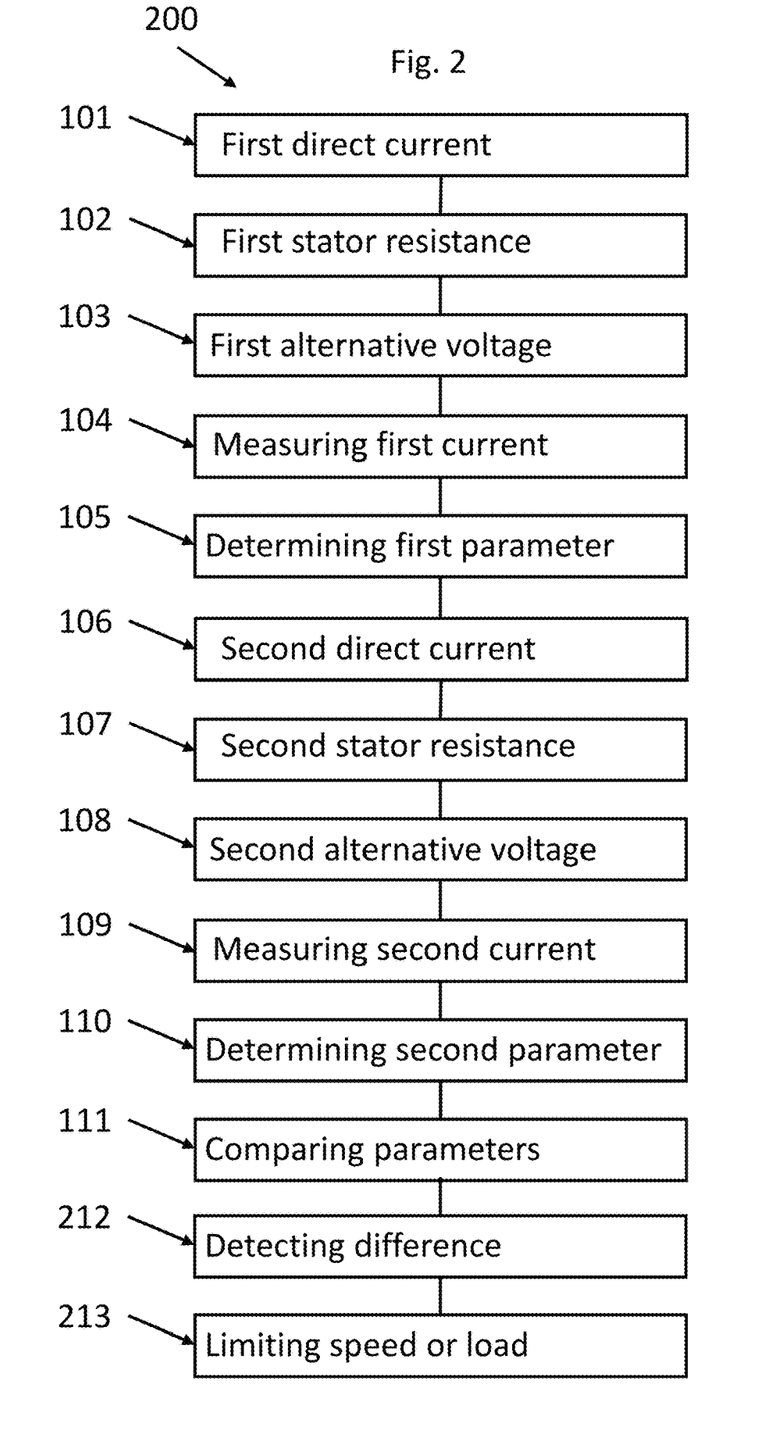
FIG. 2 illustrates another example method.

FIG. 2 illustrates another example method 200 according to this disclosure. Example method 200 comprises blocks 101-111 as described in the context of example method 100. Example method 200 further comprises block 212 of detecting a difference between the first and the second rotor flux parameter consistent with a rotor flux reduction exceeding a predetermined drift threshold. A drift threshold should be understood as a threshold representing a drift in rotor flux. A drift should be understood as corresponding to a minor variation or deterioration in rotor flux, such as a variation of less than 25%, or less than 20%, of less than 15% or of less than 10%. The threshold still should correspond to detecting some variation, for example a variation of more than 0.5%, of more than 1%, of more than 2%, of more than 3%, of more than 4% or of more than 5%. The threshold may be defined relative to a reference value, or may be defined in an absolute manner.

Example method 200 further comprises block 213 of, in response to the detecting as per block 212, limiting one or more of a motor speed or motor load in order to reduce an operating temperature. Such limiting is aimed at reducing or avoiding further drift or further deterioration. In some examples, both motor speed and load are limited. In some examples the limitation is as a percent of a nominal value. In some examples, the limitation corresponds to 120%, to 100%, to 90% or to 80% of a nominal value of the motor speed or motor load. In some examples, the detection of a relatively large difference between the first and the second rotor flux parameters corresponds to a more stringent limitation of speed or load. such limitations aim at protecting the motor over time.

Figure 3:
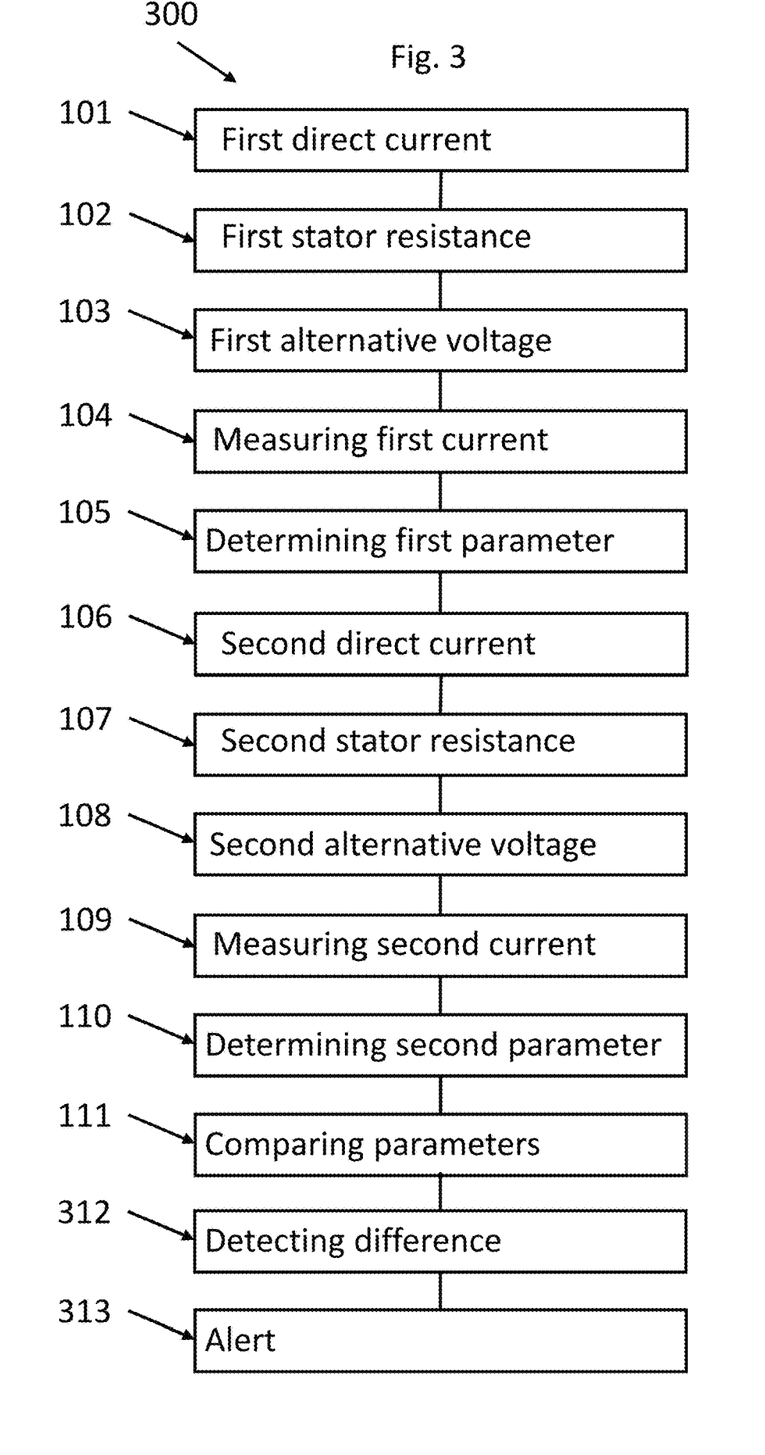
FIG. 3 illustrates a further example method.

FIG. 3 illustrates another example method 300 according to this disclosure. Example method 300 comprises blocks 101-111 as described in the context of example method 100. While not illustrated, method 300 could also comprise blocks 212 and 213 as described in the context of method 200. Example method 300 further comprises block 312 of detecting a difference between the first and the second rotor flux parameter consistent with a rotor flux reduction exceeding a predetermined demagnetization threshold. A demagnetization threshold should be understood as a threshold representing a significant reduction in rotor flux, such as a variation of more than 30%, more than 40%, more than 50% or more than 60%. The threshold may be defined relative to a reference value, or may be defined in an absolute manner.

Example method 300 further comprises block 313 of, in response to the detecting according to block 312, providing a demagnetization alert. Such demagnetization alert may be aimed at a user, an operator, or at a monitoring computing system. Such demagnetization alert may be displayed on a screen, for example a screen of the variable speed drive, or may be transmitted as an electromagnetic signal, for example via a communication network. A number of actions may be taken in response to the demagnetization alert, comprising one or more of the sending of a maintenance operator, the ordering of a replacement component such as a replacement permanent magnet, or the ordering of a replacement motor. The providing of such an alert may prevent or reduce operational downtime, or damage to an industrial system in which the motor may be included.

In some examples, the methods according to this disclosure comprise displaying a measure of the comparison between the first and the second rotor flux parameters. Such display, for example on a screen of the variable speed drive, can permit real time monitoring of the flux by a user, permitting operating the motor in extreme conditions while avoiding or limiting permanent damage.

In order to avoid or reduce an impact of the present methods on productivity, any of the methods hereby described may be applied to a motor which is assigned a repetitive mission profile, whereby the specific direct axis stator current value is determined consistently with the repetitive mission profile. A repetitive mission profile should be understood as a repetitive operational activity, involving for example both a specific motor speed and specific motor load. Such repetitive mission profile would be consistent with a repeated direct axis stator current value, such repeated direct axis stator current value being chosen as the specific direct axis stator current value according to the methods hereby described, thereby permitting running blocks such as blocks 103, 104, 108 and 109 without interrupting the repetitive mission profile, in other words, running such blocks "in the background". In other examples, a method according to this disclosure may be decoupled from the operational functioning of the motor. In some examples, the running of a method according to this disclosure may be triggered by a user.

In some examples, any of the methods hereby described comprise modifying a maintenance plan in function of the comparison between the first and the second rotor flux parameters and of a length of the time period. A maintenance plan may for example comprise one or more action items related to one or more of a motor component replacement, a maintenance visit by a maintenance operator or the running of a maintenance routine.

Figure 4:
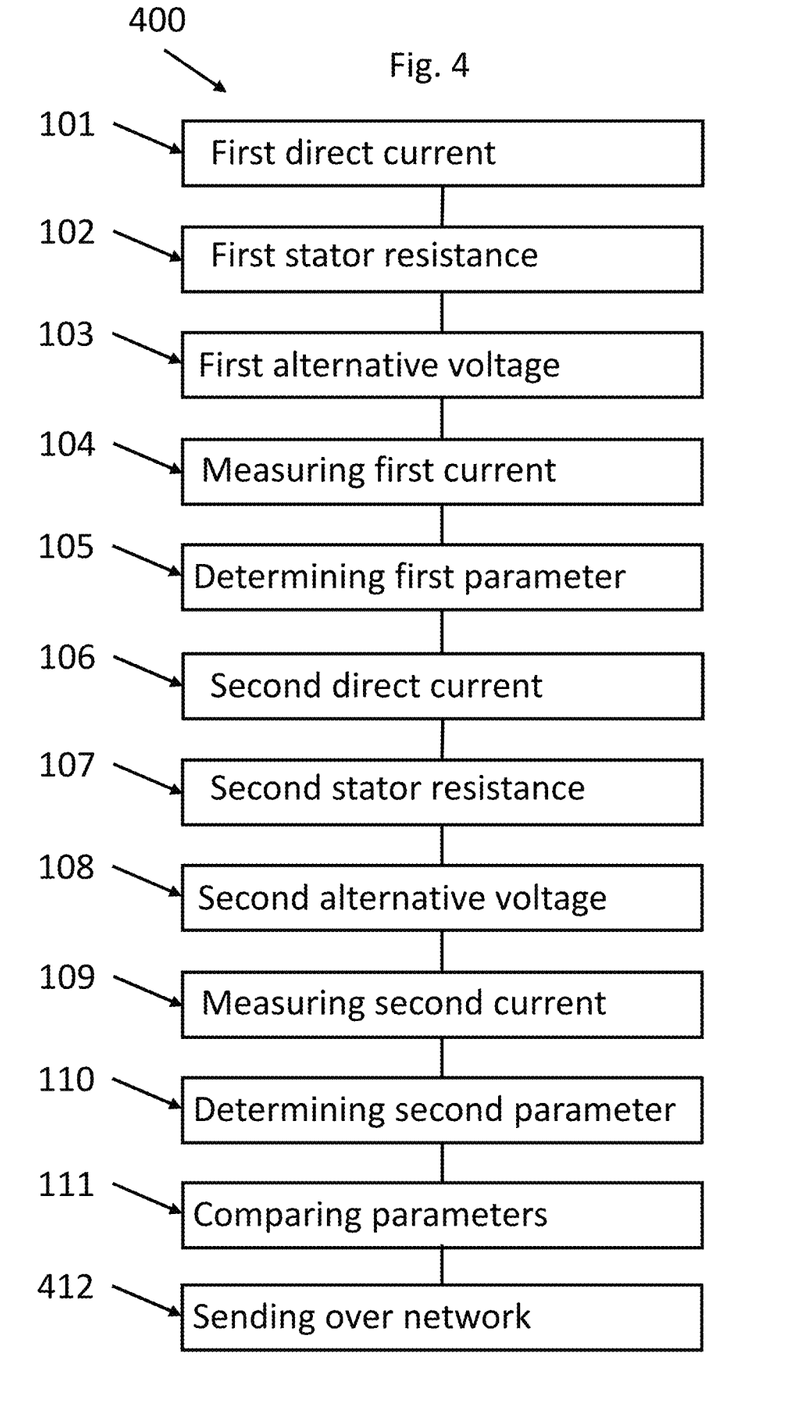
FIG. 4 illustrates yet another example method.

FIG. 4 illustrates another example method 400 according to this disclosure. Example method 400 comprises blocks 101-111 as described in the context of example method 100. While not illustrated, method 400 could also comprise blocks 212 and 213 as described in the context of method 200. While not illustrated, method 400 could also comprise blocks 312 and 313 as described in the context of method 300. Example method 400 further comprises block 412 of sending a measure of the comparison between the first and the second rotor flux parameters over a network. Such sending may for example take place via a networking module of the variable speed drive. Such sending can permit collecting data in order to monitor motor health remotely. Such sending may be wireless or by wire, or maybe a combination of both.

In some examples, the methods according to this disclosure further comprise recording an evolution of rotor flux parameters over time. Such evolution record may be for example stored in a memory of the variable speed drive according to this disclosure. Such evolution record may also, or alternatively, be stored remotely. Such evolution record may be stored on a centralized data depository, such centralized data depository storing evolution records corresponding to a plurality of variable speed drives, thereby permitting comparing an evolution of such variable speed drives and corresponding electric motors. Such centralized data depository may be maintained by a manufacturer of the electric motor or of the variable speed drive in order to monitor the plurality of variable speed drives and electric motors, thereby permitting implementing preventive measures if a certain evolution is detected for a certain type of variable speed drive or electric motor.

Figure 5:
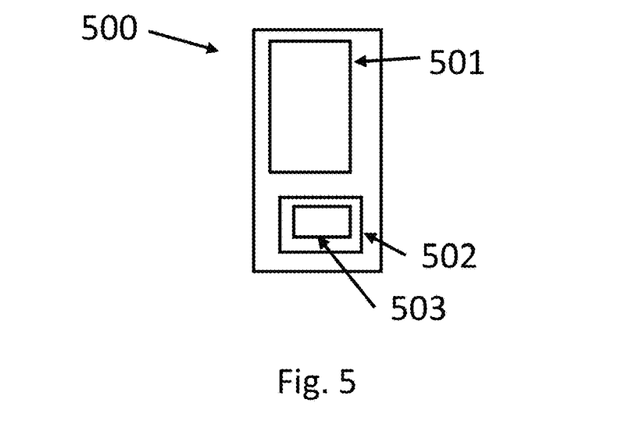
FIG. 5 illustrates an example variable speed drive.

FIG. 5 illustrates an example variable speed drive 500 comprising a processor 501, the processor 501 being configured to operate according to any of the methods hereby described. Processor 501 may comprise electronic circuits for computation managed by an operating system.

FIG. 5 also illustrates a non-transitory machine-readable or computer readable storage medium, such as, for example, memory or storage unit 502 of the variable speed drive, whereby the non-transitory machine-readable storage medium is encoded with instructions 503 executable by a processor such as processor 501, the machine-readable storage medium comprising instructions 503 to operate processor 501 to perform as per any of the example methods hereby described.

A computer readable storage according to this disclosure may be any electronic, magnetic, optical or other physical storage device that stores executable instructions. The computer readable storage may be, for example, Random Access Memory (RAM), an Electrically Erasable Programmable Read Only Memory (EEPROM), a storage drive, and optical disk, and the like. As described hereby, the computer readable storage may be encoded with executable instructions according to the methods hereby described.

Storage or memory may include any electronic, magnetic, optical or other physical storage device that stores executable instructions as described hereby.

Figure 6:
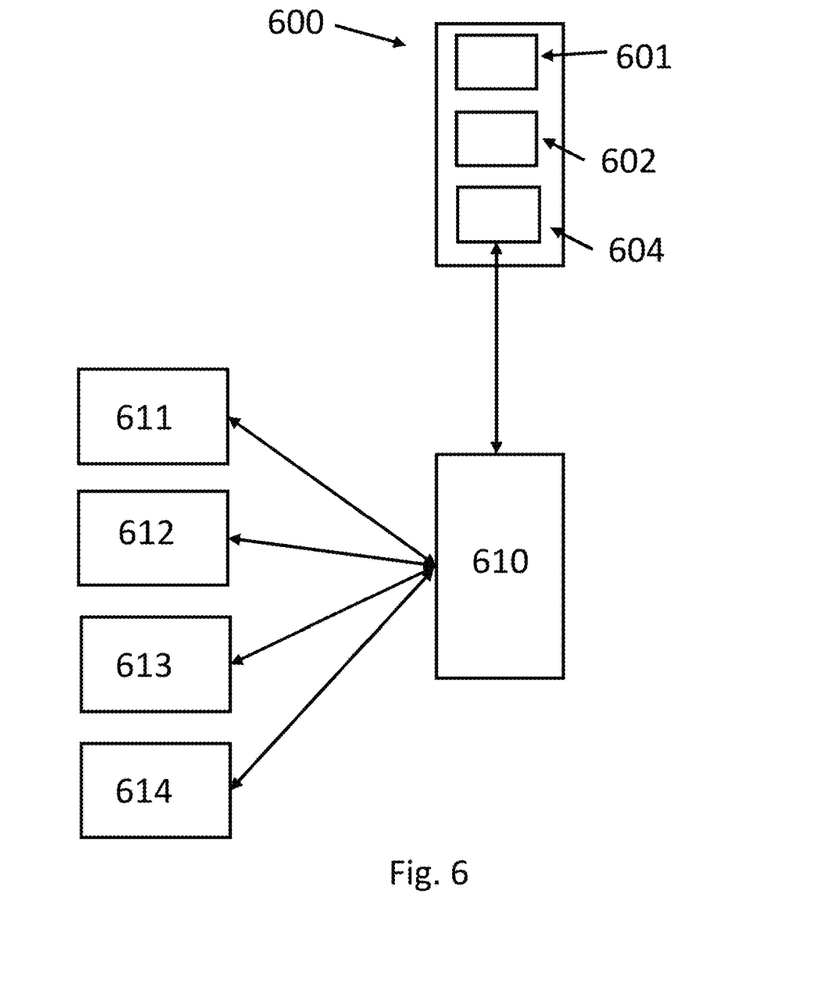
FIG. 6 illustrates another example variable speed drive and an example server.

FIG. 6 illustrates an example variable speed drive 600 comprising a processor 601 and a memory 602, the processor 601 being configured to operate according to any of the methods hereby described and comprising a block such as block 412. Processor 601 may comprise electronic circuits for computation managed by an operating system. Variable speed drive 600 further comprises a networking module 604. Networking module 604 permits transmitting data related to the rotor flux parameters according to this disclosure to a centralized data depository or server 610. Centralized depository 610 may in turn be connected via a network to a plurality of variable speed drives 611-614 according to this disclosure. Such centralized depository may compile received measures of comparison between respective first and second rotor flux parameters according to this disclosure in a memory of the centralized depository, the centralized depository processing such collected data using a processing unit or processor of the centralized depository in order to monitor the plurality of variable speed drive connected or networked to the centralized depository.

In some examples, a server such as server 610 is to further receive, via the networking module 604 or via a plurality of networking modules from variable speed drives 600, 611-614, time period data from the plurality of variable speed drives. Combining such time period data to corresponding received measures of comparison between respective first and second rotor flux parameters permits precisely monitoring flux over time for the plurality of variable speed drives concerned. In some examples, the server further receives data identifying each motor, or each motor type. In some examples, the processor of the server is to modify a maintenance plan in function of the received measures of comparison. The maintenance plan may take one or more of the rotor flux parameters data, time period data, motor identifier or motor type data into account. Collecting such data may provide a magnetic flux state diagnostic for a plurality of motors, for example based on a deviation of the data from a predetermined range. Such providing of diagnostic may permit preventing or solving issues which otherwise would negatively impact the operation of the electric motor and/or of the variable speed drive. Life expectancy of an electric motor or variable speed drive may indeed be rendered longer by applying a method according to this disclosure.

Figure 7A:
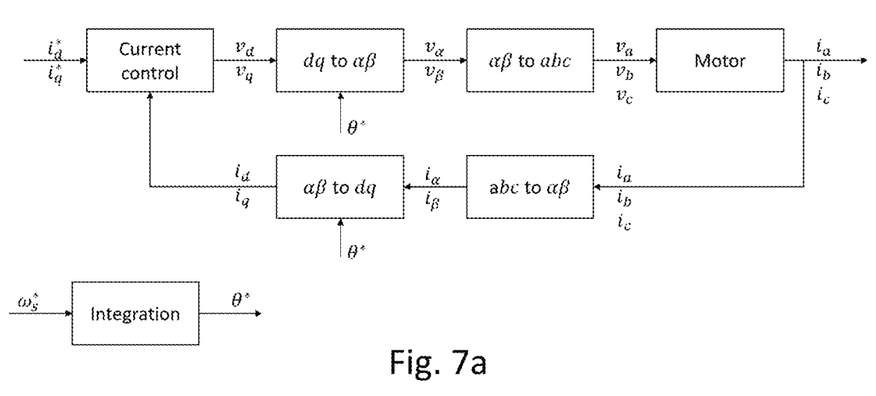
FIGS. 7*a-b* illustrate an example control loop.
Figure 7B:
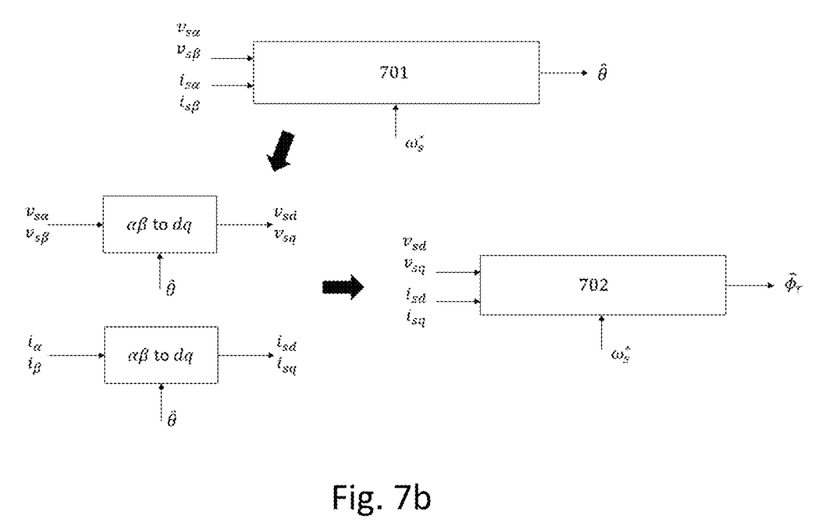

A specific example of an open-loop controller implementing an example method according to this disclosure is illustrated in FIGS. 7a and 7b. The control loop is illustrated in FIG. 7a, using the conventions used in the equations discussed above. The input to the control loop (the input values being illustrated by a *, the estimated values by a ^) comprises in this example the input specific direct axis stator current value, the related quadrature axis stator current value and the input motor speed. An integration of the motor speed provides a corresponding rotor position angle input value. The control loop illustrates that the current control operates by assigning direct and quadrature voltage values based on the input specific direct axis stator current value, the related quadrature axis stator current value, and the corresponding feedback values for both the direct axis stator current value and the related quadrature axis stator current value. The control loop illustrates that the direct and quadrature voltage values, based on the rotor position angle input value, permit deducing the alpha and beta voltage values, translating the values from the direct/quadrature d/q referential, which is a cartesian axis representation aligned with a rotor flux-linkage space vector, to the alpha/beta referential, which is a quadrature axis representation in a stationary frame fixed to the stator. The control loop illustrates that the alpha and beta voltage values may be translated to actual abc stator winding voltages ($v_a$, $v_b$, $v_c$) for the three phases a, b and c of the three phases synchronous motor. The control loop illustrates how the resulting abc stator winding currents ($i_a$, $i_b$, $i_c$) for the three phases are, in a feedback loop, reconverted first into the alpha/beta referential, and then back into the d/q referential based on the rotor position angle input value, in order to be fed back into current control.

FIG. 7b illustrates how the voltage and current values (discussed in the context of FIG. 7a) lead to estimating the rotor position angle. Such estimated rotor position angle is then used to, on one hand, obtain d/q voltage values from the alpha/beta voltage values and, on the other hand, to obtain d/q current values from the alpha/beta current values. Such d/q voltage and current values are thereafter used, in addition to the input motor speed, to obtain an estimated flux value, which may be directly or indirectly be used as a rotor flux parameter according to the example methods.

In an example, a relation 701 between, on one hand, an input of the currents applied to the stator windings in the stator alpha ($i_\alpha$) and beta ($i_\beta$) axis representation, of the voltages applied to the stator windings in the stator alpha ($v_\alpha$) and beta ($v_\beta$) axis representation, and of the pre-defined electrical angular frequency ($\omega_s$) synchronous with the motor speed will provide a rotor position angle in alpha, beta coordinate system estimate output as follows:

$$a\tan\left(-\frac{v_\alpha - R_s i_\alpha + \omega_s L_q i_\beta}{v_\beta - R_s i_\beta - \omega_s L_q i_\alpha}\right)$$

In an example, a relation 702 between, on one hand, an input of the currents applied to the stator windings in the direct ($i_{sd}$) and quadrature axis ($i_{sq}$) stator frame, of the voltages applied to the stator windings in the direct and quadrature ($v_{sq}$) axis stator frame, and of the pre-defined electrical angular frequency ($\omega_s$) synchronous with the motor speed will provide a flux parameter value output as follows:

$$\phi_r = \frac{v_{sq} - R_s i_{sq}}{\omega_s} - L_d i_{sd}$$

In other examples, such relationships may rely on value tables, or on different relations relying on the same or equivalent physical principles.

The invention claimed is:

1. A method for detecting an evolution of a magnetic state of a permanent magnet rotor in a three phases synchronous motor using a variable speed drive, the method comprising:
    during a first time interval:
        applying, using the variable speed drive, a first direct current command signal to the motor;
        in response to the applying the first direct current command signal to the motor, estimating a first stator resistance value;
        applying, using the variable speed drive, a first alternative voltage command signal to the motor, the first alternative voltage command signal corresponding to a specific direct axis stator current value;
        measuring, during the applying of the first alternative voltage command signal to the motor, first stator phase current values;
    determining, as a function of the measured first stator phase current values and of the estimated first stator resistance value, a first rotor flux parameter;
    during a second time interval:
        applying, using the variable speed drive, a second direct current command signal to the motor;
        in response to the applying the second direct current command signal to the motor, estimating a second stator resistance value;
        applying, using the variable speed drive, a second alternative voltage command signal to the motor, the second alternative voltage command signal corresponding to the specific direct axis stator current value;
        measuring, during the applying of the second alternative voltage command signal to the motor, second stator phase current values;
    determining, as a function of the measured second stator phase current values and of the estimated second stator resistance value, a second rotor flux parameter;
    comparing the first and the second rotor flux parameters, wherein:
        the first time interval has a first interval length;
        the second time interval has a second interval length; and
        the first and second time intervals are separated by a time period which exceeds at least 100 times any one of the first or second interval length.

2. The method according to claim 1, further comprising:
    detecting a difference between the first and the second rotor flux parameter consistent with a rotor flux reduction exceeding a predetermined drift threshold;
    in response to the detecting, limiting one or more of a motor speed or motor load in order to reduce an operating temperature.

3. The method according to claim 1, further comprising:
    detecting a difference between the first and the second rotor flux parameter consistent with a rotor flux reduction exceeding a predetermined demagnetization threshold;
    in response to the detecting, providing a demagnetization alert.

4. The method according to claim 1, wherein the motor is assigned a repetitive mission profile, and wherein the specific direct axis stator current value is determined consistently with the repetitive mission profile.

5. The method according to claim 1, wherein the specific direct axis stator current value is substantially zero.

6. The method according to claim 1, further comprising iterations during one or more additional intervals.

7. The method according to claim 1, wherein the time period comprises a motor stressful operation event.

8. The method according to claim 1, further comprising displaying a measure of the comparison between the first and the second rotor flux parameters.

9. The method according to claim 1, further comprising modifying a maintenance plan as a function of the comparison between the first and the second rotor flux parameters and of a length of the time period.

10. The method according to claim 1, further comprising sending a measure of the comparison between the first and the second rotor flux parameters over a network.

11. A server comprising a processor, a networking module and a memory, wherein the server is connected via a network to a plurality of variable speed drives configured to operate according to claim 10, wherein the processor is configured to compile received measures of comparison between respective first and second rotor flux parameters.

12. The server according to claim 11, wherein the server is configured to further receive, via the networking module, time period data from the plurality of variable speed drives.

13. The server according to claim 11, wherein the processor is configured to modify a maintenance plan as a function of the received measures of comparison.

14. A non-transitory computer-readable storage medium comprising instructions which, when executed by a processor, cause the processor to carry out the method according to claim 1.

15. A variable speed drive of a synchronous motor comprising a permanent magnet rotor, the variable speed drive comprising a processor and a memory, the processor being configured to operate according to the method according to claim 1.

* * * * *